May 10, 1932. F. HUMPHRIS 1,858,091
BRICK, BLOCK, SLAB, AND THE LIKE
Filed Nov. 30, 1928   3 Sheets-Sheet 1

INVENTOR
Frank Humphris
BY
ATTORNEY

May 10, 1932.　　　F. HUMPHRIS　　　1,858,091

BRICK, BLOCK, SLAB, AND THE LIKE

Filed Nov. 30, 1928　　　3 Sheets-Sheet 2

INVENTOR
Frank Humphris

BY
ATTORNEY

May 10, 1932.  F. HUMPHRIS  1,858,091
BRICK, BLOCK, SLAB, AND THE LIKE
Filed Nov. 30, 1928   3 Sheets-Sheet 3
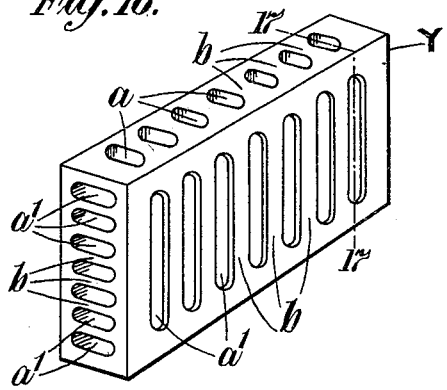
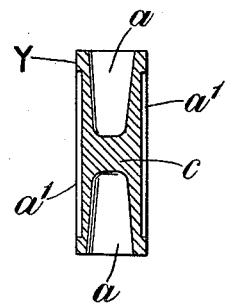
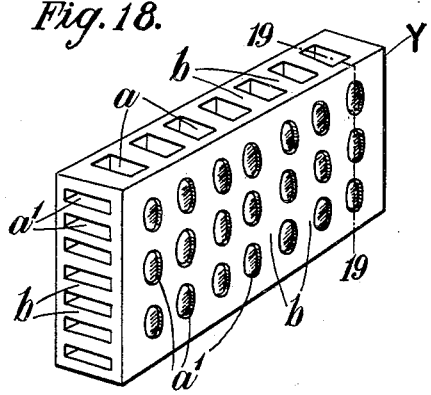
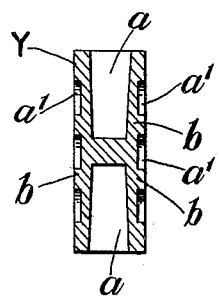
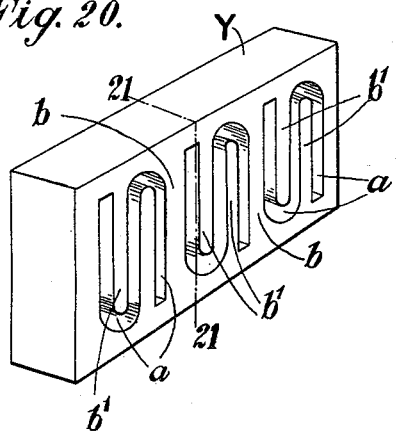
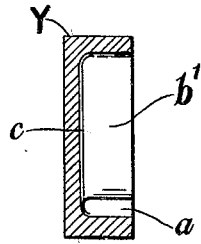
INVENTOR
Frank Humphris
BY
ATTORNEY Patented May 10, 1932

1,858,091

UNITED STATES PATENT OFFICE

FRANK HUMPHRIS, OF PARKSTONE, DORSET, ENGLAND

BRICK, BLOCK, SLAB, AND THE LIKE

Application filed November 30, 1928, Serial No. 322,801, and in Great Britain January 2, 1928.

This invention consists of improvements relating to bricks, blocks, slabs and the like or similar moulded articles made from clay or from a compound of one or more cementitious and other materials, and refers particularly to what will hereinafter be referred to collectively as moulded articles, such as bricks, blocks, slabs, tiles or the like which often have to be cut by artisans into different sizes or lengths and have also to be joined by any constraining or cementing force, or affixed to a bedding of plaster, cement or the like, or to which moulded articles, plaster, cement or the like is to be affixed.

According to this invention any moulded article made from clay or from any material which can be formed into a bond or united by an agglutinant or by any cementitious compound or material, or any moulded article which is made from any combination of materials, is provided with either a minimum of three relatively deep open-ended chambers, cavities or cells, hereinafter collectively or individually referred to as open-ended chambers, which are arranged and located in and below any one or all of the narrower ends or side-faces thereof, popularly known as "the edges"; or such moulded article is provided with a minimum of three deep open-ended chambers, each with their entrance or mouth in and below one face only of such moulded article and in this case the said open-ended chambers extend partially or nearly through such moulded article in a direction towards that face thereof remote from the one in which the said entrances or mouths thereof are located, or such moulded article is provided with a minimum of three deep open-ended chambers, each with their entrance or mouth located in or below one or the other of two of the faces of such moulded article, in which case the said open-ended chambers extend partially through such moulded article in a direction towards each other, or alternatively such moulded article is provided with a minimum of three of any or all of the said open-ended chambers, located in any of the positions in or below any or all of the faces of any such moulded article as required.

Each open-ended chamber is so produced in any moulded article made according to this invention that no communicating passage-way or hole is provided between it and any other open-ended chamber or with that face of such moulded article remote from the one in which its entrance or mouth is located, with the result that when mortar or jointing material covers the mouth of such open-ended chamber it acts as an air-chamber in which air is trapped and compressed, provided always that the distance in one direction across the opening or mouth of any such chamber between two of the so-called walls or partitions thereof which face each other is not too great to easily admit mortar or other cementitious compound therein, and that the top of each such so-called wall or partition is in or nearly in the common plane of the surface below which such chambers or cells are located, and also that the mortar or jointing-material employed is of the stiff consistency usually found in practice, and such trapped air prevents the mortar or jointing-material from filling such open-ended chambers; but it should be observed that the mortar or jointing-material partially enters into any such open-ended chamber in a quantity sufficient to form or produce a very strong keying therein; such air-chambers or enclosed spaces greatly reduce the weight of any bricks, blocks, slabs, tiles or the like, in which they are located or formed and they also act insulator-wise as hereinafter more particularly referred to.

In addition to the deep open-ended chambers, shallow chambers or cavities are optionally provided in one or more surfaces of any moulded article made according to this invention and are hereinafter referred to as shallow-cells.

The said open-ended chambers or shallow-cells formed in moulded articles made according to this invention are given their shape by means of one or more suitably formed moulds or matrices provided with the desired number of suitably formed projecting-parts which serve as cavity-formers and these are mounted and operated in a press or like machine.

One object of this invention is to provide a moulded article such as a brick, building, paving or other block, slab, tile or the like of cellular form, or having chambers therein which are arranged to extend either nearly therethrough or in a direction from one side nearly to the other and remote side thereof, or from one face thereof nearly to the other and remote face therefrom, or from each of two sides and nearly to the other and remote side therefrom, or from each of two faces and nearly to the other and remote face therefrom, or from two or more faces thereof nearly to a position therein where median planes of the said moulded article would be or are located, or in one or more of the sides and in one or more of the ends, or in either only, and such moulded article optionally has in addition shallow-cells on any or all of its faces, ends or edges; the open-ended chambers or shallow-cells being of such shape and located in such a position that either half, quarter, or such other division thereof can readily be made by cutting through the said bricks, blocks, slabs, tiles or the like in the usual manner without the risk of fracturing such moulded article at any part thereof other than through the wall or walls of that chamber or cell or those chambers or cells, as the case may be, selected as the cutting-off position.

Another object of this invention is to make a brick, building or other block, slab, tile or the like, having a cellular form and of standard external size, from suitable standard materials which is of considerably lesser weight than is ordinarily the case, and with a much greater exposed surface-area for equalizing and considerably increasing its rate of drying throughout its mass and for reducing the time ordinarily employed for its heat treatment or the burning thereof when such is a process in its manufacture, as is the case when it is made from clay or other material requiring heat, as such heat rapidly permeates the relatively thin walls or partitions located between and surrounding each open-ended chamber of any of the aforesaid moulded articles made according to this invention.

A further object of this invention is to produce a moulded article having a cellular form, which is pressed in a mould, die or matrix with which projecting-parts or chamber-formers, preferably of a tapering shape, co-operate to produce in such moulded article several partitions or walls with or without branches, between which either open-ended chambers, shallow-cells or both are formed and such partitions, open-ended chambers or shallow-cells are located in and below any or all of the so-called jointing-surfaces or in and below any of the so-called edges, faces or ends of the said moulded article, thereby ensuring the molecules of such moulded article becoming more equally compacted throughout its mass and providing a core thereof which closely approaches or is equal to the density and hardness which appertain at the exterior thereof.

A still further object is to provide moulded articles particularly bricks, blocks, slabs, tiles or the like which are of standard external dimensions with open-ended chambers separated one from the other by walls, partitions or branches thereof and optionally by a diaphragm or diaphragms and of such a shape, narrowness and depth that any mortar or jointing-compound, as is ordinarily used when making joints or bedding any such devices, cannot readily or easily enter, or be forced, except for a short distance thereinto in such a manner as to form dowels and seal the mouths thereof and thus enable them to serve in the manner of insulators against heat or cold transference and also as air-pockets in which air is compressed.

Bricks or blocks with holes therethrough and of the known forms have been made by the so-called expression or extrusion processes, or by being produced by draw-rods passing into or through the moulds in which they are made, but bricks or blocks provided with holes passing right through them allow a large proportion of the cement or motar to slip or drop through such holes, thereby wasting the mortar and making it difficult to form or maintain joints of equal thickness between any one or more courses thereof. Other known forms of bricks or blocks have also been made having one or more frogs or recesses in one face thereof, or in two faces thereof each remote one from the other, but each such frog or recess occupies a relatively larger proportion of the surface area of the face of such brick or block in which it is formed and its diameter or width across is equal to, or greater than its depth, therefore it easily fills with cement-compound or mortar, for which purpose it is usually provided, and an extravagant use of mortar or jointing-material is entailed by its use which greatly increases the cost of constructional work in which such frogs or recesses are employed, and it is to overcome these and other known defects that the moulded articles made according to this invention have been devised.

The invention will now be described with reference to the accompanying drawings, in which:

Figures 1 to 10 are views of five examples of my brick each of standard size and each showing the cellular form thereof or the open-ended chambers provided therein according to this invention.

In detail Figure 1 is a plan view of the upper face of one example of my brick in which different sizes of open-ended chambers are provided in both the upper and lower faces thereof.

Figure 9:
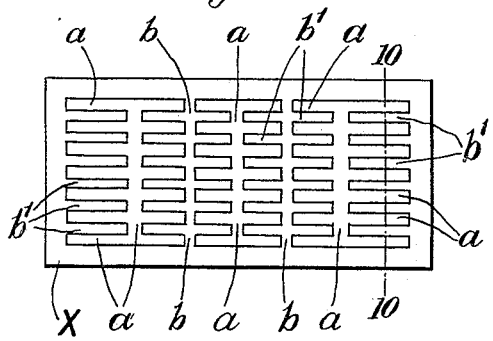

Figure 9 is a plan view of the upper or optionally the lower face of another example of my brick in which three cross-slotted open-ended chambers only are provided in one face thereof; this view illustrates how such open-ended chambers are each separated one from the other by a partition having several transverse branches or arms integral therewith which project from each such partition and also from two of the end-walls of such brick.

Figure 10:
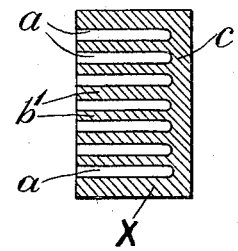

Figure 10 is a transverse vertical section on the line 10—10 of Figure 9 and illustrates how the bottom of each cross-slotted open-ended chamber is formed so as to be located not far from that face of such brick remote from that face thereof where the mouth or open end of such cross-slotted open-ended chamber is located.

Figure 1:
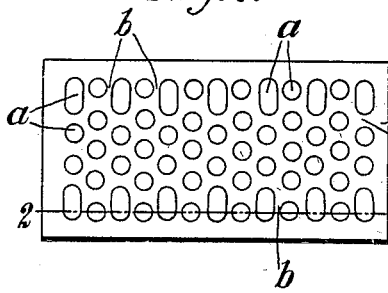
Figure 2:
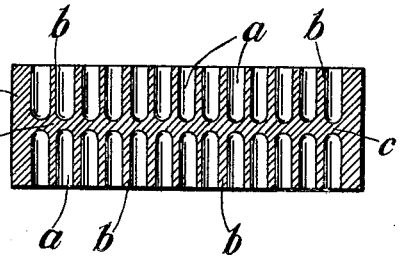
Figure 2 is a longitudinal vertical section on the line 2—2 of Figure 1 and illustrates how the bottoms of such open-ended chambers are located so as to provide a diaphragm and also how walls or partitions separate the open-ended chambers one from the other.
Figure 3:
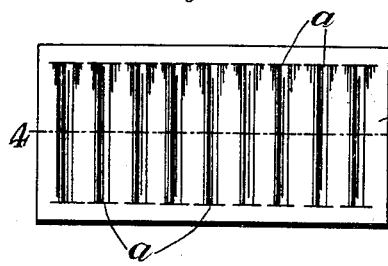
Figure 3 is a plan view of the upper face of another example of my brick in which several narrow slot-like open-ended chambers are provided in both the upper and lower faces thereof.
Figure 4:
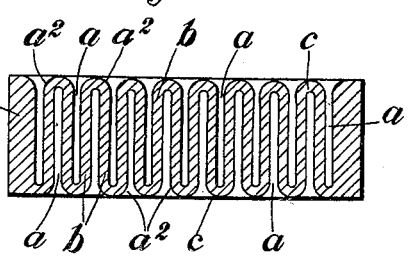
Figure 4 is a longitudinal vertical section on the line 4—4 of Figure 3, and illustrates the changed position of the diaphragm and the increased depth of the separating walls or partitions.
Figure 5:
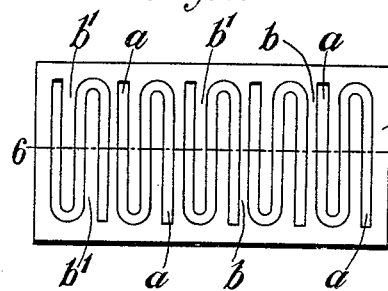
Figure 5 is a plan view of the upper face of another example of my brick in which narrow and tortuous slot-like open-ended chambers are provided in both the upper and lower faces thereof.
Figure 6:
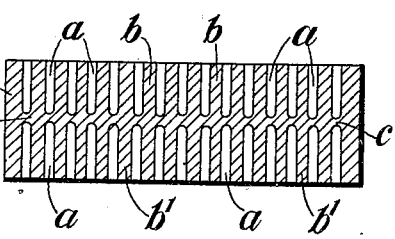
Figure 6 is a longitudinal vertical section on the line 6—6, of Figure 5 and illustrates how the bottom of such narrow and tortuous slot-like open-ended chambers are formed so as to provide a similar condition to that described with reference to Figure 2.
Figure 7:
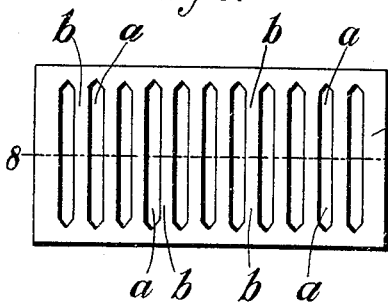
Figure 7 is a plan view of the upper face of another example of my brick in which straight slot-like open-ended chambers are provided in both the upper and lower faces thereof.
Figure 8:
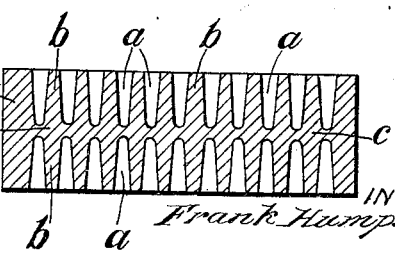
Figure 8 is a longitudinal vertical section on the line 8—8 of Figure 7 and illustrates how the bottoms of such straight slot-like open-ended chambers are formed so as to provide a similar condition to that described with reference to Figure 2.
Figure 11:
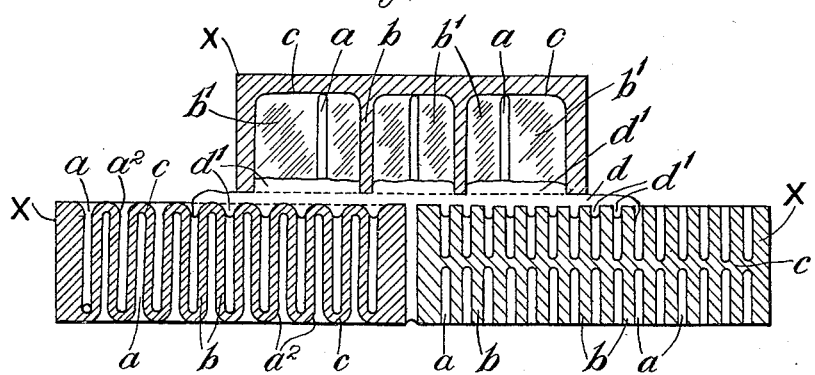

Figure 11 is a longitudinal vertical sectional view of three of my bricks each of cellular-form, the top brick is the one shown in Figures 9 and 10, the brick on the left is the one shown in Figures 3 and 4, and the brick on the right is the one shown in Figures 5 and 6; this view also illustrates how the jointing-material only partially occupies or enters each open-ended chamber.

Figures 12 to 15 are views of one example of my tile of a standard size and of cellular form in which several open-ended chambers are provided; shallow-cells are also provided according to this invention in one or more of the so-called edges thereof.

Figures 12, 13:
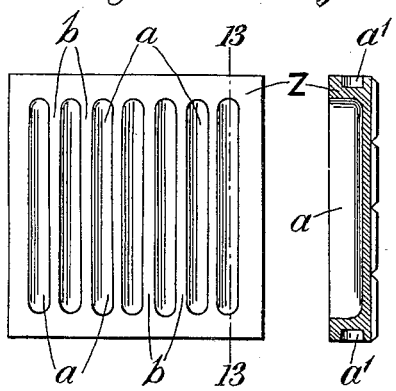

In detail Figure 12 is a plan view of the under-face of one example of my tile in which several slot-like open-ended chambers and shallow-cells also are provided.

Figure 13 is a longitudinal vertical section on the line 13—13 of Figure 12 and illustrates how the bottom of each such slot-like open-ended chamber is located not far from that face remote from that in which the mouths of each such slot-like open-ended chamber is located, and also how shallow-cells are located in the edges thereof.

Figures 14, 15:
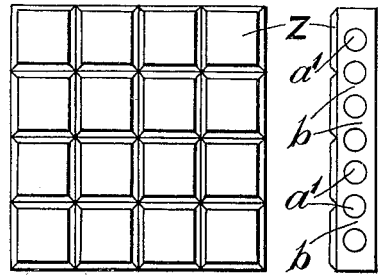

Figure 14 is a plan view of the upper face of the tile illustrated in Figures 12 and 13.

Figure 15 is a vertical end elevation of the tile illustrated in Figures 12 to 14 showing how shallow-cells which may have any contour or outline are optionally formed in any one or more of the so-called edge faces of such tile.

Figures 16, 18 and 20 are perspective views of examples of my block each of standard size and showing the open-ended chambers provided according to this invention therein in one or more of the faces thereof. Figures 16 and 18 show examples of how shallow-cells which may have any contour or outline are optionally formed in or below any one or more of the faces of such blocks.

Figures 17, 19 and 21 are vertical sections of Figures 16, 18 and 20.

In detail Figure 16 is a perspective view of one example of my multi-cellular block in which different sizes and depths of shallow-cells to that possessed by the open-ended chambers are provided in one or more faces thereof.

Figure 17 is a vertical section on the line 17—17 of Figure 16 and illustrates how the bottoms of such open-ended chambers standing in a vertical direction are located not far from the median plane of such block and how several shallow-cells of elongated form are optionally formed in either one or in two of the largest faces of such block.

Figure 18 is a perspective view of another example of my multi-cellular block in which shallow-cells of different sizes and depths to that possessed by the open-ended chambers are provided therein in rows in one or more faces thereof.

Figure 19 is a vertical section on the line 19—19 of Figure 18 and illustrates how the bottoms of such open-ended chambers are located not far from the median plane of such block and also how rows of shallow-cells are optionally formed in or below either one, or in or below two of the faces of such block.

Figure 20 is a perspective view of another example of my cellulated block in which one shape of tortuous open-ended chamber is provided in one face only of such block. This view illustrates by example how my cellulated blocks are formed so as to have only three open-ended chambers therein.

Figure 21 is a vertical section on the line 21—21 of Figure 20 and illustrates how the bottoms of such tortuous open-ended chambers are located not far from the face of such block remote from that face in which the mouths of such tortuous open-ended chambers are located.

Slabs made according to my invention contain either open-ended chambers, shallow-cells or both, similar to those employed in bricks, blocks, or tiles, so that illustrations thereof are unnecessary.

Like letters of reference refer to like parts throughout the drawings.

By viewing the illustrations of my brick X, block Y, and tile Z, each of cellular form, as shown in the various figures of the drawings it will be evident that a great variety of shapes of the contour and also of the size and shape of the section surrounding each open-ended chamber $a$ or shallow-cell $a'$ will be employed without departing from the essential conditions necessary to successfully carry this invention into effect.

Examples of moulded articles made according to this invention are illustrated in Figures 1 to 21 of the drawings and clearly show how such articles are provided either in or below one or in or below two or more, or in or below all of their faces with open-ended chambers $a$ or shallow-cells $a'$ and each such open-ended chamber $a$ is bridged or covered when mortar, cement or plaster $d$ is placed over its open end or mouth and thus becomes a sealed air-pocket or container in which air is compressed, as two of the walls or partitions $b$ or branch walls $b'$ of such open-ended chamber $a$ or those which face each other are so formed or arranged in sufficiently close relation one to the other and with such a short span between them that it is easily bridged by mortar, cement or plaster $d$ of a consistency ordinarily used in practice and due to the said short span the said walls $b$ or $b'$ assist in resisting the entry into such open-ended chambers $a$ of more than a small amount of such cementitious-compound $d$ even when such cementitious-compound $d$ is thrown from a trowel or tool upon the face of such moulded-article by an artisan, although each such chamber $a$ is deep enough for air to be sealed therein. It is also to be observed that the capacity of each open-ended chamber $a$ in which air is sealed in the manner hereinbefore described is considerably greater than is firstly easily observable, this is due to its depth, and as its capacity is almost entirely occupied by air which is compressed when its mouth or open-end is sealed, it will be evident that it can be filled or occupied only to a very small extent when any cementitious-compound $d$ covers its open end or mouth, but the economical use of such jointing-material does not reduce the efficiency or strength of any joint made between, or on, any moulded articles made according to this invention.

It will be obvious that the open-ended chambers $a$ in my brick X as shown in Figures 1 to 8 of the drawings may be formed in and below one face only thereof in a manner similar to that illustrated in Figures 9 and 10 of the drawings, or that the open-ended chambers $a$ in my brick X shown in Figures 9 and 10 of the drawings may be arranged to have partitions or walls $b$ with branches or branch-walls $b'$ integral therewith located on each side of a so-called central diaphragm $c$ lying in or approximately in a median plane of such brick X or in the manner shown in Figures 1 and 2 and 5 to 8 of the drawings, or the open-ended chambers $a$ may be formed in and below two faces thereof in a manner similar to that illustrated in Figures 1 to 8 of the drawings and such a change in position or shape of contour of such open-ended chambers $a$ is applicable to any of my bricks X, blocks Y, tiles Z, slabs or the like devices made according to this invention, with the exception that where it is essential for any face of such brick X, block Y, tile Z, or slab or the like device to be provided with the shallow-cells $a'$ as hereinbefore referred to, or alternatively where any such face has to be or remain as a plain surface.

Moulded articles made according to this invention are formed so as to provide a greater exposed surface area than is usual in the moulded articles they substitute, thus ensuring greatly accelerated and more rapid drying, heating, baking or burning thereof to take place, as the case may be. These valuable conditions are obtained by providing open-ended chambers $a$ or shallow-cells $a'$ or both which have walls or partitions $b$ optionally with branches or branch-walls $b'$ each having considerable surface area and a collective total thereof which exceeds many times that surface-area of the plane faces of any moulded article of like external shape and size but without open-ended chambers $a$ or shallow-cells $a'$. The partitions or walls $b$ or branches $b'$ arranged between or in the hereinbefore referred to open-ended chambers $a$ or shallow-cells $a'$ are of such compactness, density, width and strength and sufficiently numerous or close together to sustain the stresses or loads usually imposed on and borne by bricks, blocks, slabs, tiles or the like not provided with my open-ended chambers $a$ or cells $a'$.

Where half-bricks or half-blocks are made according to this invention to be either of standard or of odd sizes and in moulds or matrices and are not separated by cutting whole bricks or whole blocks after they are made, then such half-bricks, half-blocks or the like are always provided with the minimum number of open-ended chambers $a$ or shallow-cells $a'$ referred to when carrying this invention into effect.

Where bricks X made from any of the hereinbefore referred to materials are constructed with open-ended chambers $a$ formed in or below two of the faces thereof and with a diaphragm $c$, in each case located as illustrated in Figures 1 to 8 of the drawings, or in or below one face only as illustrated in Figures 9 and 10 of the drawings it will be evident that on the side and end faces or so-called edges thereof, shallow-cells or recesses $a'$ can optionally be provided on any one or more of such faces, or alternatively on the faces having the largest area in the manner shown by way of example in Figures 16 to 19 of the drawings or in the manner as shown by way of example in the tile illustrated in Figures 12 to 15 of the drawings, and the provision of such shallow-cells $a'$ in or below one or more of the wider or the narrower faces of a brick X, block Y, tile Z, slab or other moulded article of a like character is intended to be included in the spirit of this invention even should such provision be made in any such article that is not also provided with the deeper open-ended chambers $a$ which serve as air-chambers and as insulators against heat, moisture or cold, and in which open-ended chambers $a$ air is trapped and compressed.

Although such shallow-cells $a'$ are novel and of considerable utility when employed in moulded articles of the kind herein particularly referred to, it is always preferable to provide in substitution of such shallow-cells $a'$, where such is possible, the deeper open-ended chambers $a$ in which air can be sealed and serve insulator-wise and so reduce the absorption of moisture and arrest the conductivity of heat and cold.

Moulded articles made according to this invention offer great resistance to crushing as the molecules thereof are compacted by the external pressure exerted on the exterior of such moulded articles, and also by the internal pressure exerted therein as the projecting-parts or chamber-formers, which are of a tapering-form, coact with the mould or die-tools by which such moulded articles are given their shape, and such mould or die-tools, chamber-formers or the like are mounted in any known form of high-pressure-exerting machine and the said tapered chamber-formers are forced thereby into the core of the clot or material from which such moulded article is made and thus produce the said open-ended chambers $a$ or shallow-cells $a'$ therein. Moulded articles made so as to have open-ended chambers $a$, shallow-cells $a'$ or either or both with walls or partitions $b$ and optionally branches $b'$ therein and so as to produce a diaphragm $c$, are, when made from identical ingredients, of a more highly compacted molecular structure or dense mass and of much greater strength than the known forms of articles ordinarily employed for a like purpose; such articles are also of much less weight than the known articles they substitute of the same bulk, they also have great practical advantages, as the entrances or mouths $a^2$ of their open-ended chambers $a$ or shallow-cells $a'$ which are optionally of a slightly bevelled, tapering or curved-form, provide excellent keying for mortar, cement or plaster $d$ on which they form dowels $d'$ which enter partly into the said open-ended chambers $a$ or shallow-cells $a'$ and are thus compacted by the compressed air they trap therein and these dowels $d'$ serve to seal such open-ended chambers $a$ or shallow-cells $a'$.

The said open-ended chambers $a$ or shallow-cells $a'$ or both are optionally provided in and below any one or more of the faces of a moulded article where the provision thereof would be advantageous, as for example, in the building of thin dividing-walls of one brick X, or of one block Y in thickness; in such a case the said open-ended chambers $a$ or shallow-cells $a'$ or some of both kinds, are advantageously employed in and below all the faces of such bricks X or blocks Y as they not only increase the strength of the mortar or cement-joints between such bricks X or blocks Y, but when they are formed in and below those faces of such bricks X or blocks Y, not used as joint-faces they then serve as keying-chambers for plaster or the like when such is applied thereto and such plaster $d$ dowels into their bevelled or equivalent entrances or mouths $a^2$ or into their plain-edged entrances or mouths, as the case may be.

To enable the description of this invention to be clearly understood it should be observed that each hereinbefore referred to partition $b$ is a connector integral with and uniting two of the side or end-walls or faces of any of my moulded articles and serves to separate any open-ended chamber $a$ or shallow-cell $a'$ from any other provided therein; it should also be observed that each hereinbefore referred to branch-wall $b'$ is a projection which branches out from any one face, side or end-wall or partition $b$ of any of my moulded articles into any open-ended chamber $a$ or shallow-cell $a'$ provided therein.

I claim:

1. A hollow building element of cementitious material comprising partition walls bounding cavities separated thereby, said partition walls being spaced apart at distances less than the depth of the cavities to provide narrow open mouths to each of said cavities and the surface bordering the said mouths being rounded.

2. A hollow building element of cementitious material comprising partition walls bounding cavities separated thereby, said partition walls being spaced apart at distances less than the depth of the cavities to provide narrow open mouths and the partition walls being partly straight and partly curved.

3. A hollow building element of cementitious material comprising partition walls bounding cavities separated thereby, the said partitions extending substantially between two opposite sides of the element and curved connecting portions connecting the said partitions alternately at each of the said opposite sides of the element to provide narrow mouthed cavities in the element with rounded surfaces bounding the said mouths.

4. A hollow building element of cementitious material comprising partition walls extending inwardly from opposite exterior sides of the element alternately and bounding cavities separated thereby, said partition walls being spaced apart at distances less than the depth of the cavities to provide narrow open mouths, and the said partition walls having faces which are partly straight and partly curved.

5. A hollow building element of cementitious material comprising partition walls extending inwardly from opposite exterior sides of the element alternately and bounding cavities separated thereby, walls closing the inner ends of the said cavities, said partition walls being spaced apart at distances less than the depth of the cavities to provide narrow open mouths, and the said partition walls having faces which are partly straight and partly curved.

FRANK HUMPHRIS.